(12) United States Patent
Wang et al.

(10) Patent No.: US 11,815,780 B2
(45) Date of Patent: Nov. 14, 2023

(54) DIFFERENTIAL THERMO-OPTIC PHASE SHIFTER

(71) Applicant: Alpine Optoelectronics, Inc., Fremont, CA (US)

(72) Inventors: Tongqing Wang, Fremont, CA (US); Xingyu Zhang, Fremont, CA (US); Dawei Zheng, Fremont, CA (US)

( * ) Notice: Subject to any disclaimer, the term of this patent is extended or adjusted under 35 U.S.C. 154(b) by 430 days.

(21) Appl. No.: 17/139,334

(22) Filed: Dec. 31, 2020

(65) Prior Publication Data
US 2022/0206356 A1    Jun. 30, 2022

(51) Int. Cl.
*G02F 1/21* (2006.01)
*G02F 1/01* (2006.01)
*G02B 6/293* (2006.01)
*G02B 6/12* (2006.01)

(52) U.S. Cl.
CPC .......... *G02F 1/212* (2021.01); *G02B 6/2935* (2013.01); *G02F 1/0147* (2013.01); *G02B 2006/12159* (2013.01)

(58) Field of Classification Search
CPC ........ G02F 1/0147; G02F 1/3517; G02F 1/35; G02F 1/31; G02F 1/21; G02F 1/212; G02B 6/29353; G02B 6/2935
See application file for complete search history.

(56) References Cited

U.S. PATENT DOCUMENTS

| | | | |
|---|---|---|---|
| 5,881,199 A | 3/1999 | Li | |
| 6,240,221 B1 | 5/2001 | Thompson | |
| 6,816,665 B2 * | 11/2004 | Shani | G02F 1/0147 385/140 |

(Continued)

FOREIGN PATENT DOCUMENTS

| | | |
|---|---|---|
| JP | 2006058858 A | 3/2006 |
| JP | 2012103505 A | 11/2010 |
| WO | 2015021577 A1 | 2/2015 |

OTHER PUBLICATIONS

Patent Cooperation Treaty, International Search Report and the Written Opinion of the International Searching Authority, dated Mar. 24, 2022.

*Primary Examiner* — Christopher Stanford
*Assistant Examiner* — Journey F Sumlar
(74) *Attorney, Agent, or Firm* — CIONCA IP Law P.C.; Marin Cionca

(57) ABSTRACT

An integrated Mach-Zehnder Interferometer comprising: an upper arm and a lower arm; and a differential thermo-optic phase shifter comprising a first heating element and a second heating element collocated with the upper arm and the lower arm, respectively, the first heating element having a first resistance and the second heating element having a second resistance, an upper pad electrically connected to the first heating element, the upper pad being adapted to receive a first voltage, a lower pad electrically connected to the second heating element, the lower pad being adapted to receive a second voltage, and a common pad electrically connected to the first heating element and the second heating element, the common pad being adapted to receive a third voltage;

(Continued)

wherein, when the first, the second, and the third voltages are applied to the upper, the lower, and the common pads, respectively, a phase shift difference is thermally produced.

17 Claims, 4 Drawing Sheets

(56) References Cited

U.S. PATENT DOCUMENTS

| | | |
|---|---|---|
| 9,912,413 B1 | 3/2018 | Dupuis et al. |
| 10,394,059 B1 | 8/2019 | Anderson et al. |
| 2004/0052441 A1* | 3/2004 | Doerr .................... G02F 1/3136 |
| | | 385/3 |
| 2018/0062754 A1* | 3/2018 | Dupuis .................. G02F 1/225 |
| 2018/0173024 A1* | 6/2018 | McGreer ................ G02F 1/225 |

* cited by examiner

DIFFERENTIAL THERMO-OPTIC PHASE SHIFTER

BACKGROUND OF INVENTION

1. Field of the Invention

The invention relates generally to integrated Mach-Zehnder Interferometer optical devices, and more specifically to thermo-optic phase shifters in integrated Mach-Zehnder Interferometer optical devices.

2. Description of the Related Art

In the field of integrated photonics, and especially with regards to integrated photonics dies, Mach-Zehnder Interferometer (MZI) devices are commonly used for optical modulation, signal switching, optical sensing, and variable attenuation, among other applications. As is known, the common structure of an MZI comprises two branches or arms (an upper arm and a lower arm), joined together by a single input channel coupler and a single output channel coupler, though more arms are possible. An optical signal travelling through the MZI may comprise an initial input power and may exit the MZI having a final output power. Without considering loss for simplicity, and assuming a perfect 50/50 splitting ratio for the input and output couplers, the optical power of the MZI output signal, $P_{out}$, can be defined as a function of the phase shift difference, $\Delta\Phi$, between the two arms of the MZI and the input power, $P_{in}$, as shown by Equation 1 below:

$$P_{out} = \frac{1 + \cos(\Delta\Phi)}{2} P_{in}, \qquad \text{(Equation 1)}$$

where $\Delta\Phi = \Delta\Phi 1 - \Delta\Phi 2$, $\Delta\Phi 1$ and $\Delta\Phi 2$ representing the individual phase shifts of the upper arm and the lower arm of the MZI, respectively. As an example, when there is no phase shift difference between the two arms of the MZI, $\Delta\Phi=0$, and the $P_{out}$ is thus equal to $P_{in}$ by Equation 1 above. Thus, MZI devices commonly comprise additional integrated photonics elements to help tune and thus control the resultant phase shift difference.

Thermo-optic phase shifters, which are one such control element, are often used to produce a particular phase shift difference between the two arms of the MZI. Conventionally, thermo-optic phase shifters are realized using heating elements ("heating elements," "heaters") collocated with or disposed on each arm of the MZI, the heating elements having a resistance $R_1$ and $R_2$ on the two arms, respectively. The phase shift produced by the heating element can be expressed as $K_\Phi \cdot P_h$, where $K_\Phi$ is the thermally induced optical phase shift coefficient defined by physical parameters of the heating element and the optical waveguide collocated with the heating element; $P_h$ is the heating/thermal power produced by the heating element. Commonly, only one heating element is used on one of the two MZI arms, such as, for example, on the upper arm, where the heating element is connected to one signal pad for receiving a voltage, and one ground pad. As such, the heating of the heating element causes $\Delta\Phi 1$ to increase and $\Delta\Phi 2$ to remain unchanged, for example, such that the resultant phase difference $\Delta\Phi$ between the two arms is always positive (see e.g., Equation 1 above). In this case, if a complete output power cycle from $P_{in}$ to 0 (zero) and then from 0 back to $P_{in}$ is required, the required phase shift must cycle from 0 to $2\pi$ (in radians) on the upper arm, per the example above, requiring increased levels of voltage to be applied to the signal pad to heat the heating element, thus increasing the required power consumption of the MZI, and thus the associated operational costs.

As another conventional approach, both arms (upper and lower) of the MZI may be integrated with heaters, where the two heaters have separate signal pads and at least one ground pad (the ground pad being common to the two separate signal pads), yielding at least three pads total. Depending on whether the output power is required to be increased or decreased, one of the two heaters will be selected to operate at a time, such that, for example, either $\Delta\Phi 1$ is caused to increase while $\Delta\Phi 2$ remains constant, or $\Delta\Phi 2$ is caused to increase while $\Delta\Phi 1$ remains constant. Compared to the first approach described above, this case reduces the power consumption of each heating element for a complete output power cycle, since the required phase shift only needs to cycle from 0 to $\pi$ (in radians) on each arm, as opposed to 0 to a $2\pi$ on a single arm, for example. However, when multiple MZI's are required to be integrated on a single photonics chip (in multi-channel applications, for example), each channel of the photonics chip will require two signal pads and at least one common ground pad, such that the total number of required pads increases. In this case, the total number of required pads will be at least 2*N+1 for N number of channels on the photonics chip, thus resulting in a greater consumption of physical space on the photonics chip, thus increasing manufacturing costs. Additionally, in the case that a control algorithm is used to automate the heating of the heating elements, the required control algorithm will be more complicated as there are two heaters to select from for use. Product operation may thus be unstable due to the back and forth selecting between the upper heater and the lower heater of the MZI branches, for example.

More importantly, in either of the two cases described above the achieved phase shift on each arm of the MZI is proportional to the square of the voltage applied to each heater, as shown in Equation 2 below:

$$\Delta\Phi = K_{\Phi 1} \frac{V_1^2}{R_1} \text{ or } -K_{\Phi 2} \frac{V_2^2}{R_2}, \qquad \text{(Equation 2)}$$

where $R_1$, $L_{\Phi 1}$ and $R_2$, $K_{\Phi 2}$ are the resistances and the thermally induced optical phase shift coefficients of the upper and lower heaters, respectively, and $V_1$ and $V_2$ are the voltages applied to the upper and lower heaters, respectively. As mentioned above, when a control algorithm is used to control the heating of the heating elements, such that to control the phase shift of each MZI arm, the programming of the control algorithm and/or the automating of the control of the phase shifts may be challenging since the phase shifts ($\Delta\Phi_1$, $\Delta\Phi_2$) are not linearly proportional to the voltage applied (e.g., $V_1$, $V_2$), as illustrated in Equation 2 above. Furthermore, for certain optics applications, having a linear phase shift with respect to the applied voltage is desired/required in order to minimize negative side effects caused by higher-order harmonics in product operation.

Therefore, there is a need to solve the problems described above by providing a differential thermo-optic phase shifter and method for efficiently, easily, and cost-effectively controlling the phase shifts of the arms, and therefore the phase shift difference between them, of MZI devices.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated Mach-Zehnder Interferometer (MZI) is provided. The integrated MZI may comprise: an upper arm and a lower arm; and a differential thermo-optic phase shifter associated with the upper and the lower arms, the differential thermo-optic phase shifter comprising a first heating element and a second heating element collocated with the upper arm and the lower arm, respectively, the first heating element having a first resistance and the second heating element having a second resistance, an upper pad electrically connected to one end of the first heating element, the upper pad being adapted to receive a first voltage, a lower pad electrically connected to one end of the second heating element, the lower pad being adapted to receive a second voltage, and a common pad electrically connected to the other ends of the first heating element and the second heating element, the common pad being adapted to receive a third voltage; wherein, when the first and the second voltages are applied to the upper and the lower pads, respectively, and the third voltage is applied to the common pad, a phase shift difference is thermally produced between the upper arm and the lower arm, the phase shift difference being linearly controlled by the applied third voltage, the upper and lower heating elements having the same resistances ($R_1=R_2$) and thermally induced optical phase shift coefficients ($K_{\Phi1}=K_{\Phi2}$). Thus, an advantage of the differential phase shifter is that because the resultant phase shift difference of the optical signal is linearly dependent on the applied third voltage, the power of the outgoing optical signal may more easily be controlled and maintained. An additional advantage is that the correct operational point of the MZI may be easily and efficiently set and maintained when the MZI is operating on the photonics chip. Another advantage is that the disclosed differential thermo-optic phase shifter may be integrated in either symmetric or asymmetric MZI structures for the easy, secure, and efficient controlling of the phase shift difference.

In another aspect, an integrated photonic device (die, chip) having multiple Mach-Zehnder Interferometers (MZIs) is provided. Each integrated MZI may comprise: an upper arm and a lower arm; and a differential thermo-optic phase shifter comprising a first heating element and a second heating element collocated with the upper arm and the lower arm, respectively, an upper pad electrically connected to one end of a plurality of the first heating elements, a lower pad electrically connected to one end of a plurality of the second heating elements, and a plurality of individual common pads electrically connected to the other ends of the first heating element and the second heating element; wherein the first heating element and the second heating element are adapted to heat the upper arm and the lower arm, respectively, and wherein the plurality of individual common pads are adapted to create a heating power differential between the first heating element and the second heating element of each MZI, such that to thermally produce a phase shift difference between the upper arm and the lower arm as described above. Thus, an advantage of the differential phase shifter is that because the resultant phase shift difference of the optical signal is linearly dependent on the heating voltage applied to the individual common pad for the upper and lower heating elements having the same resistances ($R_1=R_2$) and the thermally induced optical phase shift coefficient ($K_{\Phi1}=K_{\Phi2}$), the power of the outgoing optical signal may more easily be controlled and maintained. In this case, the total number of required pads will be N+2 for N number of channels on the photonics chip. Another advantage is, due to the overall reduced number of pads needed to be integrated on multiple MZIs, photonics device miniaturization, which may greatly reduce manufacturing costs.

In another aspect, a method of producing a phase shift difference within an integrated Mach-Zehnder Interferometer (MZI) using a differential thermo-optic phase shifter, the integrated MZI comprising an upper arm and a lower arm, the differential thermo-optic phase shifter having a first heating element and a second heating element associated with the upper arm and the lower arm, respectively, an upper pad electrically connected to the first heating element, a lower pad electrically connected to the second heating element, and a common pad electrically connected to the first heating element and the second heating element, is provided. The method may comprise applying a first voltage, a second voltage, and a third voltage to the upper pad, the lower pad, and the common pad, respectively, the third voltage being selectable from a range between the first voltage and the second voltage; wherein the application of the third voltage creates a heating power differential between the heated first heating element and the heated second heating element, and thus thermally produces a phase shift difference between the upper arm and the lower arm, the phase shift difference thus being controllable via the third voltage. Thus, an advantage is the ability to individually control each phase shift difference within each MZI when a plurality of MZI's are integrated on a single integrated photonics chip. Another advantage is, due to the reduced number of pads needed to be integrated on multiple MZIs, photonics device miniaturization, which may greatly reduce manufacturing costs. An additional advantage of the disclosed differential phase shifter is the reduction in operational costs due to the reduced overall power consumption of the MZI's integrated on a photonics chip during operation. Another advantage is that the disclosed differential thermo-optic phase shifter may be integrated in either symmetric or asymmetric MZI structures for the easy, secure, and efficient controlling of the phase shift difference.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
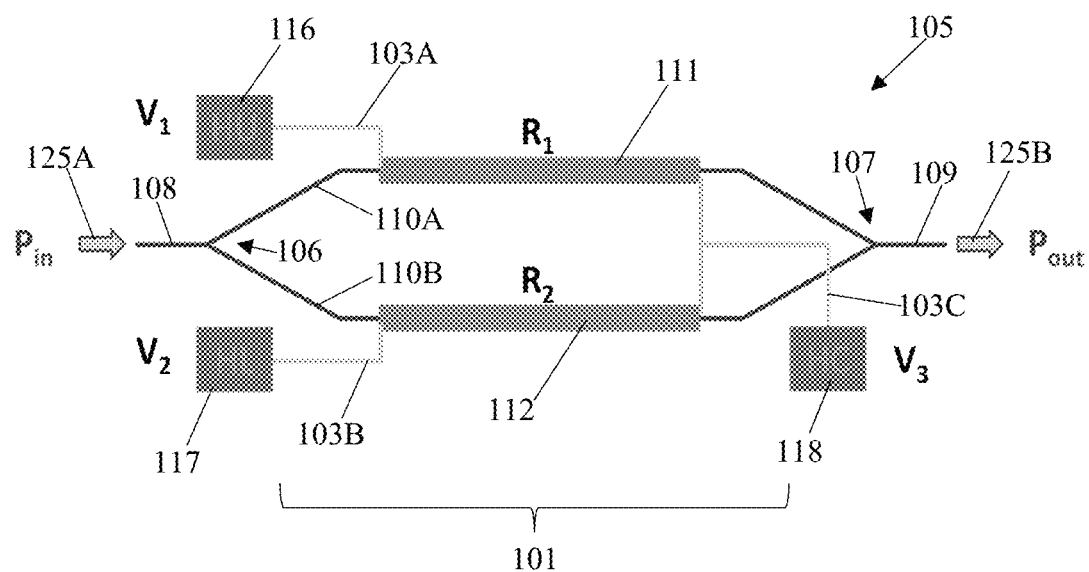
FIG. 1 is a diagram illustrating a top view of a differential thermo-optic phase shifter integrated in an exemplary symmetric MZI, according to several aspects.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 401, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 is a diagram illustrating a top view of a differential thermo-optic phase shifter 101 integrated in an exemplary symmetric MZI 105, according to several aspects. As shown in FIG. 1, the differential thermo-optic phase shifter ("differential thermo-optic phase shifter," "thermo-optic phase shifter," "differential phase shifter") 101 may comprise a number of exemplary optical components integrated on the MZI structure 105. As described previously above in the Background, the MZI 105 may comprise two branches or arms, notably an upper arm 110A and a lower arm 110B, as shown as an example. As shown in FIG. 1, the MZI 105 may comprise a single channel. As an example, the arms 110A, 110B may be branched off from a first (e.g., input) section/portion 108 of the channel at a first end of the MZI 105, and may be joined together at a second (e.g., output) section/portion 109 of the channel at a second end, as is common in MZI structures. As shown as an example, an optical signal 125A may enter the MZI 105 via the input section 108, the optical signal having an initial input power $P_{in}$. As an example, the optical signal 125A may be divided/split into two signals (not shown) of equal/substantially equal power, one traveling along each of the two arms 110A, 110B. At the output section 109, the divided optical signals (not shown) may be combined into a new, single optical signal 125B, which may then exit the MZI 105, the optical signal 125B having a final output power $P_{out}$. As will be described throughout this disclosure below, the differential phase shifter 101 may controllably and selectively induce a phase shift difference ("phase shift difference," "phase difference") $\Delta\Phi$ on the optical signal (e.g., 125A) traveling through the MZI 105, such that the resultant output power $P_{out}$ is directly related to the resultant phase difference (as shown in Equation 1 above, for example).

As shown in FIG. 1, the differential phase shifter 101 may comprise two heating elements/heaters, a first heater 111 collocated with the upper arm 110A and a second heater 112 collocated with the lower arm 110B. The heaters 111, 112 may be constructed of any suitably resistive material, such as, for example, titanium nitride, doped silicon, tungsten, etc., that may allow the heaters 111, 112 to be heated. As shown, a front end of the first heater 111 may be electrically connected, via 103A, to an upper pad 116 (labeled HU), and a front end of the second heater 112 may be electrically connected, via 103B, to a lower pad 117 (labeled HL), as an example. It should be understood that the two pads 116, 117 are essentially identical and may thus be switched in the diagram of FIG. 1. Finally, as shown, the rear ends of the first and the second heaters 111, 112, respectively, may be electrically connected, via 103C, to a common pad 118 (labeled HC), as an example. As an example, the pads 116-118 may each be constructed of conductive metal, such as aluminum, for example, such that to receive a voltage, as will be described in greater detail below. As described herein above, the pair of heaters 111, 112, and the set of pads 116-118 electrically connected (via 103A-103C) to the pair of heaters 111, 112, may thus collectively form the differential phase shifter 101.

As mentioned above, the upper pad 116, the lower pad 117, and the common pad 118 may each be adapted to receive a voltage, such that the pads 116-118 function as electrical terminals for the MZI 105 shown in FIG. 1. As shown, the heaters 111, 112 may each have a heater resistance (due to the resistive material of the heaters, for example), such that the first heater 111 comprises a first resistance $R_1$ and the second heater 112 comprises a second resistance $R_2$, as similarly described previously in the Background above. Furthermore, as labeled in FIG. 1, let the upper pad 116 be adapted to receive the voltage $V_1$, let the lower pad 117 be adapted to receive the voltage $V_2$, and let the common pad 118 be adapted to receive the voltage $V_3$. It should be understood that these voltages as labeled are exemplary and may thus be applied to any of the pads 116-118, for example. As similarly described in the Background above, the heaters 111, 112 may be heated such that to thermally induce a phase shift on the split optical signal (e.g., 125A) traveling through the arms 110A, 110B, as an example. The voltages (e.g., $V_1$-$V_3$) applied to the pads 116-118, respectively, may thus cause the heaters 111, 112 to be heated, and thus to induce a phase shift of the traveling optical signal within each arm 110A, 110B, for example. Thus, in order to induce a particular phase shift, one must select particular voltages, as will be described in detail below.

As an example, when the MZI 105, having the differential phase shifter 101, is integrated on a photonics chip (not shown), the input section 108 of the channel and the output section 109 may be optically connected to an optical channel (not shown) of the photonics chip. When an optical signal travelling along the optical channel approaches the MZI 105, the optical signal 125A having an input power $P_{in}$ may enter the input section 108 and may be split by the splitter 106 into two separate optical signals (not shown), as mentioned above. Each individual optical signal may now propagate along the upper arm 110A and the lower arm 110B, respectively, and may thermally interact with the first and the second heating elements 111, 112, respectively. As the upper optical signal travels by the first heating element 111 and the lower optical signal travels by the second heating element 112, the first heating element 111 and the second heating element 112 induce a phase shift ($\Delta\Phi 1$, $\Delta\Phi 2$) in the upper and the lower optical signals, respectively, caused by their radiated heat, for example. When the upper and the lower optical signals (not shown) are combined by the combiner 107 at the output section 109, for example, the resultant output power $P_{out}$ of the optical signal 125B is directly related to the difference of the individual phase shifts $\Delta\Phi 1$, $\Delta\Phi 2$, such that $\Delta\Phi = \Delta\Phi 1 - \Delta\Phi 2$, as similarly described in the Background above. As will be described in detail below, the differential phase shifter 101 may produce a phase shift differential/difference $\Delta\Phi$, such that the individual phase shifts $\Delta\Phi 1$, $\Delta\Phi 2$ are each proportional to the heating/thermal power of each heater 111, 112 collocated with each arm 110A, 110B, respectively, of the MZI 105.

As an example, a fixed voltage, in the form of $V_1$, can be applied onto the upper pad 116, while a second fixed voltage, in the form of $V_2$, is applied onto the lower pad 117, such that the voltage applied onto the common pad 118, in the form of $V_3$, is tunable in a range between $V_1$ and $V_2$, for example. Thus, as the voltage drop $V_1$-$V_3$ causes a heating of the first heater 111 and as the voltage drop $V_3$-$V_2$ causes a heating of the second heater 112, the voltage $V_3$ creates a heating power differential between the first heater 111 and the second heater 112. As such, the achieved phase shift difference $\Delta\Phi$ between the two arms 110A, 110B of the MZI 105 is thus proportional to the heating power differential between the first heater 111 and the second heater 112, i.e., $P_{h1}-P_{h2}$, where $P_{h1}$ is the heating power in the first heater 111 and Phe is the heating power in the second heater 112. Defining power (P) to generally be the ratio of the square of the applied voltage (V) to the resistance (R), shown by $$P = \frac{V^2}{R},$$

and referring to FIG. 1, the relationship between the phase difference and the heating power differential can be defined as follows:

$$\Delta\Phi = \Delta\Phi 1 - \Delta\Phi 2 \quad \text{(Equation 3)}$$
$$\rightarrow \Delta\Phi = K_{\Phi 1} \cdot P_{h1} - K_{\Phi 2} \cdot P_{h2}, \text{ so}$$
$$\Delta\Phi =$$
$$K_{\Phi 1}\frac{(V_1-V_3)^2}{R_1} - K_{\Phi 2}\frac{(V_3-V_2)^2}{R_2} = \left(\frac{K_{\Phi 1}}{R_1} - \frac{K_{\Phi 2}}{R_2}\right)V_3^2 -$$
$$\left(\frac{2K_{\Phi 1}V_1}{R_1} - \frac{2K_{\Phi 2}V_2}{R_2}\right)V_3 + \left(\frac{K_{\Phi 1}V_1^2}{R_1} - \frac{K_{\Phi 2}V_2^2}{R_2}\right).$$

Now for a symmetric differential thermo-optic phase shifter (101 in FIG. 1), wherein the heater resistances $R_1$, $R_2$ and the thermally induced optical phase shift coefficients $K_{\Phi 1}$, $K_{\Phi 2}$ on each arm 110A, 110B are equal, such that $R_1=R_2=R$, and $K_{\Phi 1}=K_{\Phi 2}=K_\Phi$, then Equation 3 above may be simplified as follows:

$$\Delta\Phi = K_\Phi \frac{(V_1-V_3)^2}{R} - K_\Phi \frac{(V_3-V_2)^2}{R} = \quad \text{(Equation 4)}$$
$$K_\Phi \frac{V_1^2 - V_2^2 - 2(V_1-V_2)V_3}{R} =$$
$$K_\Phi \frac{V_1^2 - V_2^2}{R} - K_\Phi \frac{2(V_1-V_2)}{R}V_3.$$

Analyzing Equation 4 above, one can clearly deduce that the resultant phase shift difference $\Delta\Phi$ linearly depends on the voltage $V_3$ applied to the common pad 118, since, as stated previously above, the voltages $V_1$ and $V_2$ are fixed, the thermally induced optical phase shift coefficient $K_\Phi$ is an unchanging quantity, and the heater resistance R is a known, unchanging quantity. Compared to the conventional heating approach summarized in Equation 2 in the Background, in which $\Delta\Phi$ depends on the square of the applied voltage V, such that the relationship between the two is parabolic, the approach derived and summarized in Equation 4 above is much simpler due to its linearity. Referring back to Equation 1 in the Background, the output power of the outgoing optical signal (125B in FIG. 1) is dependent on the phase shift difference $\Delta\Phi$. As such, the ability to easily control the resultant phase difference $\Delta\Phi$ using the applied heating voltage $V_3$, via their linear relationship, may thus allow the output power of the optical signal 125B to be controlled, as needed for various optics and photonics applications. Thus, an advantage of the differential phase shifter is that because the resultant phase shift difference of the optical signal is linearly dependent on the applied heating voltage, the power of the outgoing optical signal may more easily be controlled and maintained.

As an example, referring to FIG. 1, the first (e.g., input) and the second (e.g., output) sections 108, 109, respectively, may each be provided with a photodiode (not shown) adapted to measure the power of the optical signal travelling through the channel. As such, a first photodiode (not shown) may be adapted to measure the input power $P_{in}$ of the incoming optical signal 125A, and a second photodiode (not shown) may be adapted to measure the output power $P_{out}$ of the outgoing optical signal 125B. The photodiodes may be in electrical communication with a computer (not shown), for example, that may collect the power readings, $P_{in}$ and $P_{out}$, and compare the two, such that the heating voltage $V_3$ may be selectively applied to the common pad 118 by the computer. As described above, the phase shift difference $\Delta\Phi$ is linearly dependent on $V_3$, and thus the output power $P_{out}$ is effectively controlled via $V_3$ (see Equation 1, for example). Thus, the application of the heating voltage $V_3$ may be automated, such that, depending on the needs of the particular product and optical application, the output power may be controlled and maintained using $V_3$, as an advantage.

In a first case, let $V_2$ be grounded (i.e., $V_2=0V$). With $V_2$ equal to zero, Equation 4 now becomes:

$$\Delta\Phi = K_\Phi\left(\frac{V_1^2}{R} - \frac{2V_1}{R}V_3\right) \quad \text{(Equation 5)}$$

In this case, when $V_3$ is tuned from 0V to $V_1$, and vice versa, the phase shift difference $\Delta\Phi$ is changed from $$\frac{V_1^2}{R} \text{ to } -\frac{V_1^2}{R},$$

and vice versa, using Equation 5 above. As such, the phase shift difference $\Delta\Phi$ changes sign (e.g., positive to negative) during the voltage tuning of $V_3$, enabling the capability of achieving either a positive phase difference or a negative phase difference. Therefore, during the automated application of $V_3$ (via the control algorithm of the computer, for example), there is no need to select and tune the voltage applied to a particular arm (e.g., 110A, 110B) to achieve such an effect. As described previously in the Background, one of the conventional heating approaches requires the selection of a particular MZI arm, and thus the switching back and forth between arms, which may lead to product operation instability. Thus, an advantage is that the control algorithm controlling $V_3$ may be simplified, which reduces instances of potential operation malfunction and instability, thereby increasing the efficiency at which the output power may be controlled. Another advantage is that the correct operational point of the MZI may be easily and efficiently set and maintained when the MZI is operating on the photonics chip.

As mentioned previously above, the differential phase shifter 101 may be symmetric, such that the heater resistances $R_1$, $R_2$ and the thermally induced optical phase shift coefficients $K_{\Phi 1}$, $K_{\Phi 2}$ are equal, respectively (i.e., $R_1=R_2$, and $K_{\Phi 1}=K_{\Phi 2}$). As such, it should be understood that it is preferable to configure the differential phase shifter 101 to have heaters 111 and 112 that are substantially identical, such that, for example, the heaters 111 and 112 possess the same geometric dimensions and layout (e.g., width, length, thickness, and shape). Furthermore, as shown in FIG. 1, it is preferable that the heaters 111 and 112 be collocated with the arms 110A and 110B, respectively, at the same or substantially the same location (with respect to the arms 110A and 110B). Thus, the heaters 111 and 112 may be preferably identical (e.g., $R_1=R_2$, and $K_{\Phi 1}=K_{\Phi 2}$), such that the disclosed differential phase shifter 101 is symmetric.

As is known in the art, the two arms (e.g., 110A, 110B) of the MZI can be either symmetric or asymmetric. As mentioned previously above, the MZI 105 shown in FIG. 1 may comprise a splitter 106 disposed along the first input section/channel 108 and a combiner 107 disposed along the second output section/channel 109, for example. The splitter 106 and the combiner 107 may be couplers, for example, that split the incoming optical signal and recombine the split optical signals, respectively, as shown in FIG. 1. The couplers may be 1×2 couplers, as shown in FIG. 1, that function as three-port optical devices, or may be 2×2 couplers (not shown), for example, that function as four-port optical devices. The arms 110A and 110B shown in FIG. 1 are symmetric, meaning that both arms are the same length and relative width (excluding the heaters 111 and 112, for example). Additionally, as shown, the upper arm 110A and the lower arm 110B may be parallelly disposed between the splitter 106 and the combiner 107, for example. However, as stated above, the MZI 105 may be provided as asymmetric, meaning that one arm (e.g., 110A) may be longer than the other arm, and/or may loop, for example, such that the two arms 110A and 110B no longer have equal lengths. Nonetheless, the disclosed thermo-optic phase shifter 101 may function as described herein above for the asymmetric case as well, as will be described in detail below.

Figure 2A:
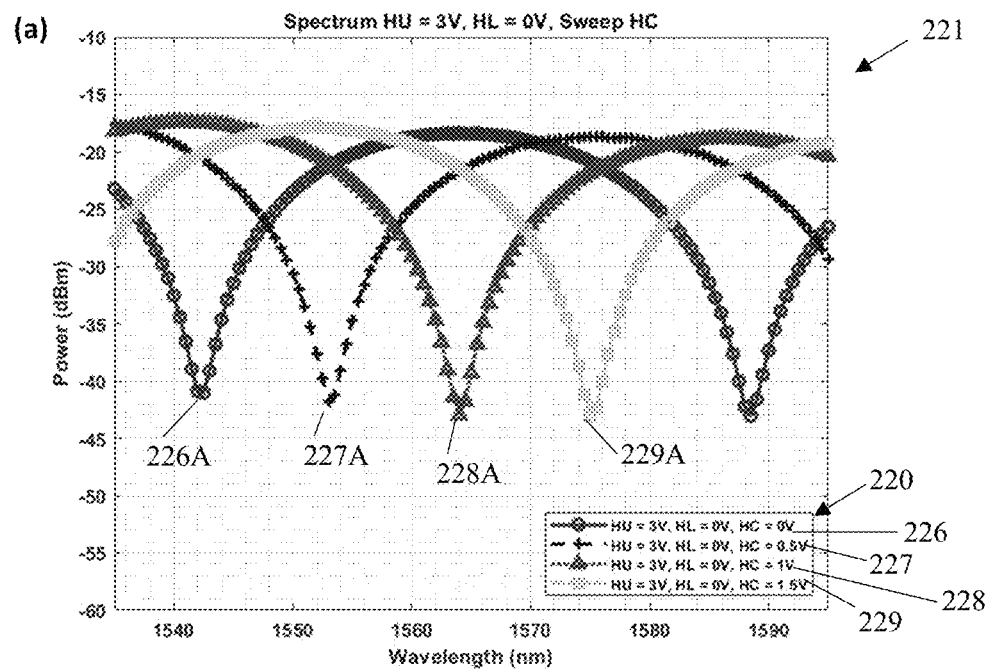
FIGS. 2A-2B are exemplary plots illustrating testing data measured from a fabricated asymmetric MZI having the differential thermo-optic phase shifter shown in FIG. 1, according to an aspect.
Figure 2B:
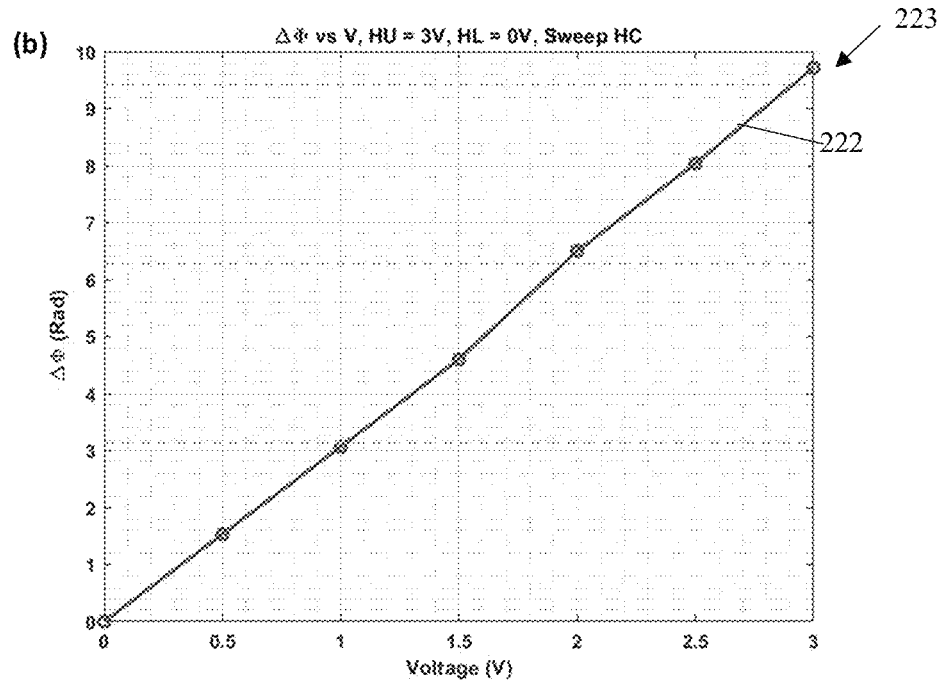

FIGS. 2A-2B are exemplary plots illustrating testing data measured from a fabricated asymmetric MZI having the differential thermo-optic phase shifter 101 shown in FIG. 1, according to an aspect. In this test, the voltage $V_1$ applied to the upper pad HU (e.g., 116) was fixed at 3V and the voltage $V_2$ applied to the lower pad HL (e.g., 117) was fixed at 0V, replicating the case defined by Equation 5, for example. The voltage $V_3$ applied to the common pad HC (e.g., 118) was then swept from 0V to 3V, as indicated in the plot legend 220 of FIG. 2A.

FIG. 2A depicts the transmission spectrum of the asymmetric MZI under the swept HC voltages ($V_3$). As shown, the transmission spectrum plot 221 plots the power of the optical signal in decibel-milliwatts (dBm) for various wavelengths of the optical signal in nanometers (nm), as an example. As shown in FIG. 2A, as the value of $V_3$ (labeled HC) is increased from 0V (shown at 226 in legend 220) up to 1.5V (shown at 229), the transmission spectrum shifts horizontally. For example, by tracking the local minimum of the optical signal power spectrum for varying values of voltage $V_3$, a dependent relationship between the two can be realized. As an example, at 0.5V (shown at 227), the corresponding local minimum on the power spectrum in the plot 221 horizontally shifts from 226A down to 227A, as shown. At 1V (shown at 228), as another example, the corresponding local minimum on the power spectrum in the plot 221 horizontally shifts from 226A down to 228A, as shown. At 1.5V (shown at 229), as another example, the corresponding local minimum on the power spectrum in the plot 221 horizontally shifts from 226A down to 229A, as shown. Thus, as expected, the horizontal shift in the transmission spectrum under increasing voltages $V_3$ is due to the change of the phase shift difference (i.e., $\Delta\Phi$) between the two arms (i.e., 110A and 110B in FIG. 1).

FIG. 2B depicts the amount of phase shift difference as a function of $V_3$ extracted from the transmission spectrum of FIG. 2A. As shown, plot 223 plots the phase shift difference (i.e., $\Delta\Phi$) of the optical signal in radians (Rad) versus the HC applied voltage $V_3$ in volts (V). As shown in FIG. 2B, as the value of $V_3$ (on the x-axis) is increased from 0V up to 3V, the phase shift increases linearly, as indicated by the line-of-best-fit 222, for example. As described previously when referring to FIG. 1, for a substantially symmetric differential phase shifter in a symmetric MZI, the phase shift difference (e.g., $\Delta\Phi$) is linearly dependent on the voltage $V_3$ applied to the common pad HC (e.g., 118 in FIG. 1). Thus, as illustrated by the plot 223, the same holds true for the asymmetric MZI case (again having a substantially symmetric differential phase shifter), and therefore further validates the approach outlined previously above in Equation 5. Thus, an advantage is that the disclosed differential thermo-optic phase shifter may be integrated in either symmetric or asymmetric MZI structures for the easy, secure, and efficient controlling of the phase shift difference.

As described previously above when referring to FIG. 1, the heaters (e.g., 111 and 112) may be configured to be substantially identical, such that the heater resistances $R_1$ and $R_2$ and the thermally induced optical phase shift coefficients $K_{\Phi 1}$ and $K_{\Phi 2}$ associated with the upper arm and the lower arm (e.g., 110A, 110B), respectively, may be configured to be equal (i.e., $R_1=R_2=R$, and $K_{\Phi 1}=K_{\Phi 2}=K_\Phi$, for example). This condition ultimately led to the conclusion defined by Equation 4, that the resultant phase shift difference $\Delta\Phi$ is linearly dependent on the applied voltage $V_3$, as described above. Thus, it is important to note that it is preferable, and even necessary, to configure the disclosed symmetric differential thermo-optic phase shifter (e.g., 101) such that to comprise substantially identical heating elements thus having substantially identical/equal resistances and thermally induced optical phase shift coefficients. Should the two resistances $R_1$ and $R_2$ of the heating elements be unequal, for example, the phase change difference $\Delta\Phi$ would no longer linearly depend on the applied voltage $V_3$, as will be described in more detail below.

Figure 3:
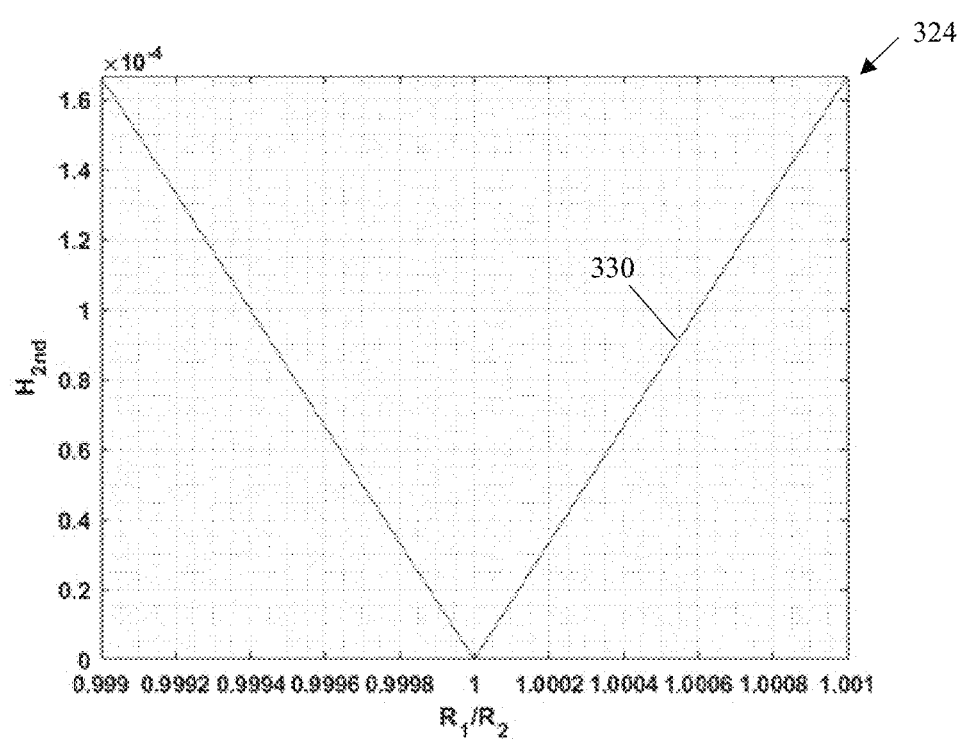
FIG. 3 is an exemplary plot illustrating a function of the normalized second harmonics, $H_{2nd}$, against the ratio of the resistances of the heating elements of the lower arm and the upper arm, respectively, of the symmetric MZI of FIG. 1, according to an aspect.

FIG. 3 is an exemplary plot illustrating a function of the normalized second harmonics, $H_{2nd}$, against the ratio of the resistances of the heating elements of the lower arm and the upper arm, respectively, of the symmetric MZI of FIG. 1, according to an aspect. As mentioned above, the approach described throughout this disclosure greatly relies on the condition that the thermo-optic phase shifter be symmetrically constructed, such that the heater resistances $R_1$, $R_2$ and the thermally induced optical phase shift coefficients $K_{\Phi 1}$, $K_{\Phi 2}$ are equal or substantially equal. From Equation 3 above, let the absolute value of the ratio ($H_{2nd}$) of the $2^{nd}$ order term to the linear term ($V_3$ acting as the variable) with $K_{\Phi 1}=K_{\Phi 2}$ be given below:

$$H_{2nd} = \left| \frac{\frac{1}{R_1} - \frac{1}{R_2}}{\frac{2V_1}{R_1} - \frac{2V_2}{R_2}} \right| = \left| \frac{1 - \frac{R_1}{R_2}}{2V_1 - 2V_2\frac{R_1}{R_2}} \right|. \quad \text{(Equation 6)}$$

Let $H_{2nd}$ now be a function of the ratio ($R_1/R_2$) of the individual heater resistances $R_1$ and $R_2$. For $V_1=3V$ and $V_2=0V$, Equation 6 can be rewritten as follows:

$$H_{2nd} = \left| \frac{1 - \frac{R_1}{R_2}}{6} \right|. \quad \text{(Equation 7)}$$

As shown in FIG. 3, the plot 324 plots the absolute value ratio of the $2^{nd}$ order term to the linear term against the ratio of $R_1/R_2$, according to Equation 7 above. As shown, as the ratio of $R_1/R_2$ increases, the $H_{2nd}$ value 330 linearly decreases, until the value reaches 0 (zero) when $R_1/R_{2=1}$, as an example. When $R_1/R_2$ is equal to 1, the resistances $R_1$ and $R_2$ are equal/substantially equal, such that $R_1=R_2=R$, as in Equation 4 above. Then, as shown in the plot 324, as the value of $R_1/R_2$ increases past 1 (on the x-axis), the $H_{2nd}$ value linearly increases, as an example. Thus, at all points where the value of $R_1/R_2$ is not equal to 1, the $H_{2nd}$ value is nonzero (positive), which would significantly affect the phase shift difference's linear dependency on $V_3$. Referring back to Equation 3 above, the $2^{nd}$ order term $$\left( \frac{K_{\Phi 1}}{R_1} - \frac{K_{\Phi 2}}{R_2} \right)$$

does not reduce to 0 (zero), and therefore does not cancel out $V_3^2$, when $R_1/R_2$ and $K_{\Phi 1}/K_{\Phi 2}$ do not equal 1, resulting in the phase shift difference $\Delta\Phi$ no longer being linearly dependent on $V_3$. Thus, as described above and as illustrated via the plot 324 in FIG. 3, the thermo-optic phase shifter 101 of FIG. 1 should be configured to be symmetric, such that the heater resistances $R_2$ and $R_1$ and the thermally induced optical phase shift coefficients $K_{\Phi 1}$ and $K_{\Phi 2}$ are equal (i.e., $R_1=R_2$ and $K_{\Phi 1}=K_{\Phi 2}$). This condition can be accomplished, for example, by constructing the heaters (e.g., 111, 112) of the same resistive material, for example, and by providing the heaters in the same locations on the arms (e.g., 110A, 110B) and configuring the heaters with the same geometric dimensions (e.g., width, length and thickness, such that each respective volume area is the same), as previously described above.

As described previously above when referring to FIG. 1, as a first case, $V_2$ can be grounded, such that Equation 5 is derived. As another example, in a second case, let $V_1$ and $V_2$ be set to the same value, but with opposite signs, such that $V_2=-V_1$. Thus, in the second case, Equation 4 above now becomes:

$$\Delta\Phi = -K_\Phi \frac{4V_1}{R} V_3. \quad \text{(Equation 8)}$$

As shown in Equation 8 above, in this case, $\Delta\Phi$ is again linearly related to the applied voltage $V_3$, but without a DC offset term, as compared to Equation 5. This second case may thus further simplify the control algorithm described previously, which may be beneficial for certain photonics applications, as an example.

Figure 4:
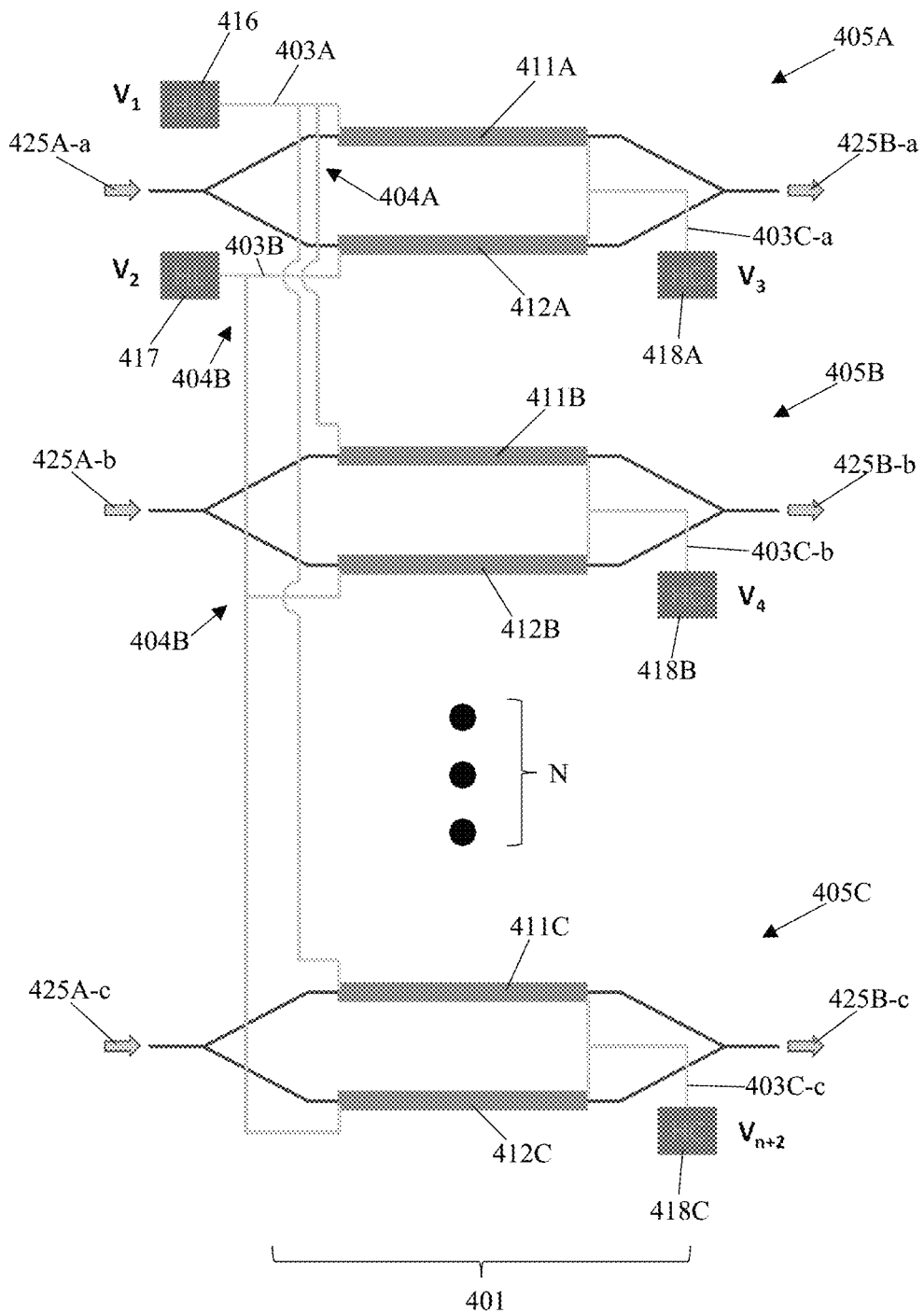
FIG. 4 is a diagram illustrating a top view of the differential thermo-optic phase shifter of FIG. 1, applied across a plurality of exemplary symmetric MZI's, according to an aspect.

FIG. 4 is a diagram illustrating a top view of the differential thermo-optic phase shifter 101 of FIG. 1, applied across a plurality of exemplary symmetric MZI's 405A-405C, according to an aspect. As an example, in practice, more than one MZI may be provided on a single integrated photonics chip, particularly if the photonics chip comprises multiple optical channels. In such cases, one MZI may be integrated on each optical channel of the integrated photonics chip, for example, with each input and output channel of the MZI being optically connected to the optical channel, respectively. As will be described in detail below, the differential phase shifter (e.g., 101) described throughout this disclosure above may be configured to be expanded across the plurality of MZI's, as needed.

As shown in FIG. 4, a plurality of MZI's 405A-405C may be provided parallelly on an integrated photonics chip (not shown) comprising a plurality of optical channels (not shown), as mentioned above. As shown as an example, the differential phase shifter 401 may be configured such that only one upper pad 416 and only one lower pad 417 are necessary for the plurality of MZI's 405A-405C integrated on the photonics chip (not shown). As shown, the upper pad 416 may comprise a main electrical connection bus 403A, from which additional electrical connections 404A may branch off and connect to each first heating element 411A-411C of each MZI 405A-405C, respectively. Similarly, as shown, the lower pad 417 may comprise a main electrical connection bus 403B, from which additional electrical connections 404B may branch off and electrically connect to each second heating element 412A-412C of each MZI 405A-405C, respectively, as an example. Because the voltage $V_1$ applied to the upper pad 416, and the voltage $V_2$ applied to the lower pad 417 may be fixed, as described throughout this disclosure above, the MZI's 405A-405C can effectively share the upper pad 416 and the lower pad 417, such that the voltages $V_1$, $V_2$ applied to the upper pad 416 and the lower pad 417, respectively, are transferred to each first heater 411A-411C and each second heater 412A-412C, respectively.

As shown, each MZI 405A-405C may be provided with a common pad 418A-418C, one for each pair of heating elements. As similarly described above when referring to FIG. 1, each common pad may electrically join the rear ends of each pair of heating pads, such that common pad 418A electrically connects, via 403C-a, the heating elements 411A and 412A, common pad 418B electrically connects, via 403C-b, the heaters 411B and 412B, and common pad 418C electrically connects, via 403C-c, the heaters 411C and 412C, as an example. It should be understood that each MZI may be provided with a common pad, such that more than the three common pads shown are possible; for example, if five MZI's are provided, then five common pads would be used.

As an example, providing each MZI with its own common pad may allow the phase shift difference (e.g., $\Delta\Phi$) within each MZI to be individually controlled. For example, in the case that three MZI's are provided on an integrated photonics chip, it may be desirable to induce a unique phase shift difference within each of the MZI's shown in FIG. 4, such that the input power of each optical signal 425A-a-425A-c entering each MZI 405A-405C, respectively, is uniquely adjusted. As such, the control algorithm of the computer (not shown) may supply the voltage $V_3$ onto the common pad 418A, as shown, such that a first phase shift difference is induced on the incoming optical signal 425A-a. Simultaneously, the voltage $V_4$ may be applied onto the common pad 418B, such that a second phase shift difference is induced on the incoming optical signal 425A-b, and the voltage $V_{n+2}$ may be applied onto the common pad 418C, as shown, such that a third phase shift difference is induced on the incoming optical signal 425A-c, for example. Thus, as described throughout this disclosure above, each of the outgoing optical signals may comprise a unique output power, such that outgoing optical signal 425B-a has a first output power, outgoing optical signal 425B-b has a second output power, and outgoing optical signal 425B-c has a third output power. Thus, an advantage is the ability to individually control each phase shift difference within each MZI, with the overall required number of pads being significantly reduced compared to conventional methods, when a plurality of MZI's are integrated on a single integrated photonics chip.

It should be understood that, while in the example above the induced phase shift differences among the MZI's were described as being different, the phase shift differences may be selected to be the same, such that each MZI operates at the same point or substantially at the same point across the chip. Thus, depending on the particular optical application, the control algorithm may be adapted to supply each of the HC voltages having the same voltage value, or a different voltage value, to produce identical phase shift differences or different phase shift differences, respectively, as needed.

As compared to the conventional method described previously in the Background, in which three pads are required to be connected to each MZI on a photonics chip, the ability to share two pads among a plurality of MZI's greatly reduces the number of pads needed to be integrated on the photonics chip in total. For example, the conventional method requires at least 2*N+1 pads to be provided on the photonics chip for N number of channels, while the method described above utilizing the disclosed differential phase shifter 401 requires only N+2 pads for the same N number of channels. For example, a photonics chips having 4 optical channels would only need 6 pads total, as opposed to the 9 that would be minimally required for the conventional approach. Thus, an advantage is, due to the reduced number of pads needed to be integrated on each MZI, photonics device miniaturization, which may greatly reduce manufacturing costs. Having a fewer number of pads also correlates to a fewer number of required voltage sources needed to supply voltage to each pad, significantly reducing the overall power supply during chip operation. For example, the conventional method requires 4*n voltage sources to be applied to the pads on the photonics chip for n number of channels, while the method described above utilizing the disclosed differential phase shifter 401 requires only n+2 voltage sources (shown at 418C, for example) for the same n number of channels. Thus, another advantage of the disclosed differential phase shifter is the reduction in operational costs due to the reduced overall power supply to the MZI's integrated on a photonics chip during operation.

It should be understood that while reference was made throughout this application to a control algorithm operating on a computer adapted to control the applied HC voltage such that to automate the phase shifting process, the applied HC voltage may alternatively be supplied manually (e.g., by a user), if desired. It should also be understood that the heating elements described throughout this disclosure above may be constructed of various resistive materials, such as, for example, titanium nitride, doped silicon, graphene, diamond, etc. It should be understood that the disclosed differential phase shifter may be applied to MZI's integrated on photonics dies based on various platforms, such as, for example, silicon, silicon nitride, silica, lithium niobate, polymer, III-V materials, etc. Furthermore, it should be understood that the disclosed differential phase shifter may be applied to various optical and photonics fields, such as, for example, optical communications, optical sensing, optical computing, automotive applications, quantum applications, etc. It should also be understood that optical signals may travel through the MZI in the opposite direction (e.g., from right to left) of that shown throughout the drawings and described above. It should also be understood that each of the Equations 1-8 are provided herein above as examples and as mathematical descriptions of the disclosed thermo-optic phase shifter and are thus not intended to be limiting. Therefore, it should be understood that other variations of the above equations are possible and such variations are thus descriptive of the disclosed thermo-optic phase shifter.

It may be advantageous to set forth definitions of certain words and phrases used in this patent document. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this application above, the phrase "optical signal" and related phrases/terms are to be interpreted as being a light signal/beam, as is customary in the art. Such a light signal/beam may originate from any conventional optical light source, such as an LED or a laser, as it may vary from application to application. It should therefore be understood that the light beam, as is known, is a form of electromagnetic radiation, and can be represented as an electromagnetic wave having a particular wavelength. Additionally, as used above, the terms "chip" and "die" and their variations are synonymous in this application.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An integrated Mach-Zehnder Interferometer (MZI) comprising:
    an upper arm and a lower arm; and
    a differential thermo-optic phase shifter associated with the upper and the lower arms, the differential thermo-optic phase shifter comprising:
        a first heating element and a second heating element collocated with the upper arm and the lower arm, respectively, the first heating element having a first resistance and the second heating element having a second resistance;
        an upper pad electrically connected to the first heating element, the upper pad being adapted to receive a first voltage;
        a lower pad electrically connected to the second heating element, the lower pad being adapted to receive a second voltage; and
        a common pad electrically connected to the first heating element and the second heating element, the common pad being adapted to receive a third voltage;
    wherein, the upper arm has a first thermally induced optical phase shift coefficient associated with the first heating element and the lower arm has a second thermally induced optical phase shift coefficient associated with the second heating element, and wherein, when the first and the second voltages are applied to the upper and the lower pads, respectively, and the third voltage is applied to the common pad, a phase shift difference is thermally produced between the upper arm and the lower arm, the phase shift difference being controlled by the applied third voltage and the first resistance and associated first thermally induced optical phase shift coefficient and the second resistance and associated second thermally induced optical phase shift coefficient are equal in value ($R_1=R_2=R$ and $K_{\Phi 1}=K_{\Phi 2}=K_\Phi$), respectively.

2. The integrated MZI of claim 1, wherein the heating of the first and the second heating elements creates a phase shift in the upper and the lower arms, respectively, the phase shift difference thus being a difference between the phase shifts.

3. The integrated MZI of claim 1, wherein the first and the second heating elements are each constructed of a resistive material.

4. The integrated MZI of claim 1, wherein the produced phase shift difference is defined by:

$$\Delta\Phi = K_\Phi \frac{V_1^2 - V_2^2}{R} - K_\Phi \frac{2(V_1 - V_2)}{R} V_3,$$

where $V_1$ denotes the first voltage, $V_2$ denotes the second voltage, $V_3$ denotes the third voltage, R denotes the equal value of the first and the second resistances, and $K_\Phi$ denotes the equal value of the first and the second thermally induced optical phase shift coefficients, the produced phase shift difference thus being linearly proportional to the applied third voltage.

5. The integrated MZI of claim 1, further comprising:
    an input channel disposed at a first end and having a splitter, the splitter optically dividing the input channel such that to form the upper arm and the lower arm; and
    an output channel disposed at a second end and having a combiner, the combiner optically combining the upper arm and the lower arm such that to form the output channel.

6. The integrated MZI of claim 5, wherein the splitter and the combiner are couplers.

7. The integrated MZI of claim 5, wherein the input channel and the output channel are axially aligned, and the upper arm and the lower arm are parallelly and symmetrically disposed between the splitter and the combiner.

8. An integrated Mach-Zehnder Interferometer (MZI) comprising:
an upper arm and a lower arm; and
a differential thermo-optic phase shifter comprising:
a first heating element and a second heating element deposited on the upper arm and the lower arm, respectively;
an upper pad electrically connected to the first heating element;
a lower pad electrically connected to the second heating element; and
a common pad electrically connected to the first heating element and the second heating element;
wherein the upper arm has a first thermally induced optical phase shift coefficient associated with the first heating element and the lower arm has a second thermally induced optical phase shift coefficient associated with the second heating element, and wherein, when the first heating element and the second heating element are adapted to heat the upper arm and the lower arm, respectively, such that to thermally produce a phase shift difference between the upper arm and the lower arm; and
wherein the upper pad, the lower pad, and the common pad are adapted to receive a first voltage, a second voltage, and a third voltage, respectively, such that to cause the heating of the first and the second heating elements, and thus the heating of the upper arm and the lower arm, respectively, and the common pad is adapted to receive a third voltage, the third voltage creating the heating power differential between the first and the second heating elements, and thus thermally producing the phase shift difference between the upper arm and the lower arm, the phase shift difference being linearly proportional to the third voltage.

9. The integrated MZI of claim 8, wherein the first and the second heating elements are each constructed of a resistive material having a resistance.

10. The integrated MZI of claim 9, wherein the resistance of the first heating element is equal in value to the resistance of the second heating element, and wherein, the first thermally induced optical phase shift coefficient associated with the first heating element is equal in value to the second thermally induced optical phase shift coefficient associated with the second heating element.

11. A method of producing a phase shift difference within an integrated Mach-Zehnder Interferometer (MZI) using a differential thermo-optic phase shifter, the integrated MZI comprising an upper arm and a lower arm, the differential thermo-optic phase shifter having a first heating element and a second heating element associated with the upper arm and the lower arm, respectively, an upper pad electrically connected to the first heating element, a lower pad electrically connected to the second heating element, and a common pad electrically connected to the first heating element and the second heating element, the method comprising:

applying a first voltage, a second voltage, and a third voltage to the upper pad, the lower pad, and the common pad, respectively, the third voltage being selectable from a range between the first voltage and the second voltage;
wherein the application of the third voltage creates a heating power differential between the heated first heating element and the heated second heating element, and thus thermally produces a phase shift difference between the upper arm and the lower arm, the phase shift difference thus being controllable via the third voltage.

12. The method of claim 11, further comprising:
launching an optical signal having an input power into the integrated MZI, the optical signal being caused to split and propagate along the upper arm and the lower arm, respectively;
wherein a first optical signal of the split optical signal propagating along the upper arm undergoes a first phase shift, and a second optical signal of the split optical signal propagating along the lower arm undergoes a second phase shift;
the phase shift difference thus being a difference between the first and the second phase shifts; and
wherein the first and the second optical signals are caused to combine into a final optical signal, the final optical signal having an output power being modified by the phase shift difference.

13. The method of claim 12, wherein the heat radiated by the first heating element and the second element thermally modifies the first phase shift and the second phase shift, respectively, and wherein the applied third voltage alters the produced phase shift difference.

14. The method of claim 13, wherein the first and the second heating elements are each constructed of a resistive material having a resistance, the resistance of the first heating element being equal in value to the resistance of the second heating element and a first thermally induced optical phase shift coefficient associated with the first heating element is equal in value to a second thermally induced optical phase shift coefficient associated with the second heating element.

15. The method of claim 14, wherein the produced phase shift difference is defined by:

$$\Delta\Phi = K_\Phi \frac{V_1^2 - V_2^2}{R} - K_\Phi \frac{2(V_1 - V_2)}{R} V_3,$$

where $V_1$ denotes the first voltage, $V_2$ denotes the second voltage, $V_3$ denotes the third voltage, R denotes the equal value of the resistances of the first and the second heating elements, and $K_\Phi$ denotes the equal value of the first and the second thermally induced optical phase shift coefficients, the produced phase shift difference thus being linearly proportional to the applied third voltage.

16. The method of claim 11, wherein the applied second voltage is zero Volts.

17. The method of claim 11, wherein the applied first voltage and the applied second voltage are numerically equal but opposite in sign, such that $V_2 = -V_1$, where $V_1$ denotes the first voltage and $V_2$ denotes the second voltage.

* * * * *